United States Patent
Hsiao et al.

(10) Patent No.: US 9,449,635 B2
(45) Date of Patent: Sep. 20, 2016

(54) METHOD FOR FORMING A MAGNETIC HEAD FOR PERPENDICULAR MAGNETIC RECORDING

(71) Applicant: HGST Netherlands B.V., Amsterdam (NL)

(72) Inventors: Wen-Chien David Hsiao, San Jose, CA (US); Kyusik Shin, Pleasanton, CA (US); Sue Siyang Zhang, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 249 days.

(21) Appl. No.: 13/886,088

(22) Filed: May 2, 2013

(65) Prior Publication Data
US 2014/0326699 A1    Nov. 6, 2014

(51) Int. Cl.
*G11B 5/127* (2006.01)
*H04R 11/00* (2006.01)
*G11B 5/855* (2006.01)
*G11B 5/31* (2006.01)

(52) U.S. Cl.
CPC ............ *G11B 5/855* (2013.01); *G11B 5/1278* (2013.01); *G11B 5/3116* (2013.01); *G11B 5/3163* (2013.01)

(58) Field of Classification Search
CPC ... G11B 5/1276; G11B 5/1278; G11B 5/315; G11B 5/3153; G11B 5/3163; G11B 5/39; G11B 5/855; Y10T 29/49043; Y10T 29/49046; Y10T 29/49048; Y10T 29/49052; Y10T 29/49055

USPC ............ 29/603.11, 603.13–603.16, 603.18; 216/22, 39, 41, 48, 65; 360/123.03, 360/123.06, 123.1, 125.02, 125.16, 125.17, 360/125.3
See application file for complete search history.

(56) References Cited

U.S. PATENT DOCUMENTS

| | | | |
|---|---|---|---|
| 5,298,450 A * | 3/1994 | Verret | 438/207 |
| 5,706,176 A * | 1/1998 | Quinn et al. | 361/760 |
| 6,649,486 B1 * | 11/2003 | Balakumar et al. | 438/424 |
| 7,070,698 B2 | 7/2006 | Le | |
| 7,129,162 B2 * | 10/2006 | Hong et al. | 438/637 |
| 7,159,302 B2 | 1/2007 | Feldbaum et al. | |
| 7,885,036 B2 | 2/2011 | Matono et al. | |
| 7,975,366 B2 | 7/2011 | Li et al. | |
| 8,018,677 B1 * | 9/2011 | Chung et al. | 360/125.03 |
| 8,027,125 B2 * | 9/2011 | Lee et al. | 360/125.03 |
| 8,066,892 B2 | 11/2011 | Guthrie et al. | |
| 8,066,893 B2 | 11/2011 | Baer et al. | |
| 8,108,986 B2 | 2/2012 | Liu | |
| 8,117,738 B2 | 2/2012 | Han et al. | |
| 8,125,732 B2 | 2/2012 | Bai et al. | |
| 8,134,802 B2 | 3/2012 | Bai et al. | |
| 8,182,704 B2 | 5/2012 | Sasaki et al. | |
| 8,184,399 B2 | 5/2012 | Wu et al. | |
| 8,189,295 B2 | 5/2012 | Han et al. | |
| 8,277,669 B1 * | 10/2012 | Chen et al. | 216/22 |
| 8,793,866 B1 * | 8/2014 | Zhang et al. | 29/603.13 |

(Continued)

*Primary Examiner* — Paul D Kim
(74) *Attorney, Agent, or Firm* — Patterson & Sheridan, LLP

(57) ABSTRACT

The embodiments of the present invention generally relate to a method for forming a trench in which a write pole is deposited therein. The trench is formed with a single mask and multiple reactive ion etching (RIE) processes and has substantially straight side walls and a consistent bevel angle along the length of the write pole. The consistent bevel angle along the length of the write pole allows the bevel angle at the ABS to be consistent regardless of where the cut is when defining the ABS.

12 Claims, 5 Drawing Sheets

(56) References Cited

U.S. PATENT DOCUMENTS

| | | |
|---|---|---|
| 8,929,027 B1* | 1/2015 | Sugiyama et al. ....... 360/125.01 |
| 2007/0177301 A1* | 8/2007 | Han et al. ..................... 360/126 |
| 2008/0006900 A1* | 1/2008 | Chan et al. ................... 257/499 |
| 2008/0297945 A1* | 12/2008 | Han et al. .................. 360/125.3 |
| 2010/0078406 A1* | 4/2010 | Guthrie et al. ................. 216/22 |
| 2011/0039413 A1* | 2/2011 | Akinmade-Yusuff et al. ............................. 438/700 |
| 2011/0134567 A1* | 6/2011 | Chen et al. ............... 360/123.12 |
| 2011/0255196 A1 | 10/2011 | Wu et al. |
| 2013/0161185 A1* | 6/2013 | Mao et al. ............... 204/192.34 |
| 2014/0167206 A1* | 6/2014 | Wu et al. ...................... 257/499 |

\* cited by examiner

METHOD FOR FORMING A MAGNETIC HEAD FOR PERPENDICULAR MAGNETIC RECORDING

BACKGROUND

1. Field

Embodiments of the present invention generally relate to a perpendicular magnetic recording (PMR) writer for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil which results in a magnetic write field being emitted toward the adjacent magnetic medium, the write field being substantially perpendicular to the surface of the medium. The magnetic write field locally magnetizes the medium and then travels through the medium and returns to the write head at the location of the return pole where the write field is sufficiently spread out and weak so no previously recorded bits of data are erased.

The write pole is first deposited on a substrate and has a straight region and a flared region. The trench in which the write pole is deposited typically is not vertical and has a bevel angle with respect to vertical. Using conventional methods, the bevel angle increases from the end of the straight region to the end of the flared region. Thus, when the write pole on the substrate is cut at a predetermined position to define the ABS, the bevel angle at the ABS may vary depending on the cut position. In addition, more than one mask is typically used for forming the trench.

Therefore, there is a need in the art for an improved method for forming a trench for the write pole.

SUMMARY OF THE INVENTION

The embodiments of the present invention generally relate to a method for forming a trench in which a write pole is deposited therein. The trench is formed with a single mask and multiple reactive ion etching (RIE) processes and has substantially straight side walls and a consistent bevel angle along the length of the write pole. The consistent bevel angle along the length of the write pole allows the bevel angle at the ABS to be consistent regardless of where the cut is when defining the ABS.

In one embodiment, a method for forming a magnetic head for perpendicular magnetic recording is disclosed. The method includes depositing a fill layer over a substrate, depositing a mask layer over the fill layer, removing a portion of the mask layer to expose a first portion of the fill layer, removing the first portion of the fill layer by a first reactive ion etching process to form a trench having a first bevel angle, and removing a second portion of the fill layer from the trench by a second ion etching process to enlarge the trench and change the first bevel angle to a second bevel angle. The second bevel angle is smaller than the first bevel angle. The method further includes depositing a magnetic material within the trench, wherein the trench has substantially straight side walls.

In another embodiment, a method for forming a magnetic head for perpendicular magnetic recording is disclosed. The method includes depositing a fill layer over a substrate, depositing a mask layer over the fill layer, removing a portion of the mask layer to expose a first portion of the fill layer, etching the first portion of the fill layer with a first plasma containing chlorine and fluorine to form a trench having a first bevel angle, and etching the fill layer inside the trench with a second plasma containing chlorine and fluorine to enlarge the trench and change the first bevel angle to a second bevel angle. The second bevel angle is smaller than the first bevel angle. The method further includes depositing a magnetic material within the trench, wherein the trench has substantially straight side walls.

In another embodiment, a method for forming a magnetic head for perpendicular magnetic recording is disclosed. The method includes depositing a fill layer over a substrate, depositing a mask layer over the fill layer, removing a portion of the mask layer to expose a first portion of the fill layer, and etching the first portion of the fill layer in a process chamber with a first plasma containing chlorine and fluorine to form a trench having a first bevel angle. A first chlorine containing gas and a first fluorine containing gas are introduced to the process chamber, and the first chlorine containing gas and the first fluorine containing gas have a first flow rate ratio. The method further includes etching the fill layer inside the trench in the process chamber with a second plasma containing chlorine and fluorine to enlarge the trench and change the first bevel angle to a second bevel angle. A second chlorine containing gas and a second fluorine containing gas are introduced to the process chamber, and the second chlorine containing gas and the second fluorine containing gas have a second flow rate ratio that is about 5% less than the first flow rate ratio. The method further includes depositing a magnetic material into the trench, wherein the trench has substantially straight side walls.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments of the present invention generally relate to a method for forming a trench in which a write pole is deposited therein. The trench is formed with a single mask and multiple RIE processes and has substantially straight side walls and a consistent bevel angle along the length of the write pole. The consistent bevel angle along the length of the write pole allows the bevel angle at the ABS to be consistent regardless of where the cut is when defining the ABS.

Figure 1:
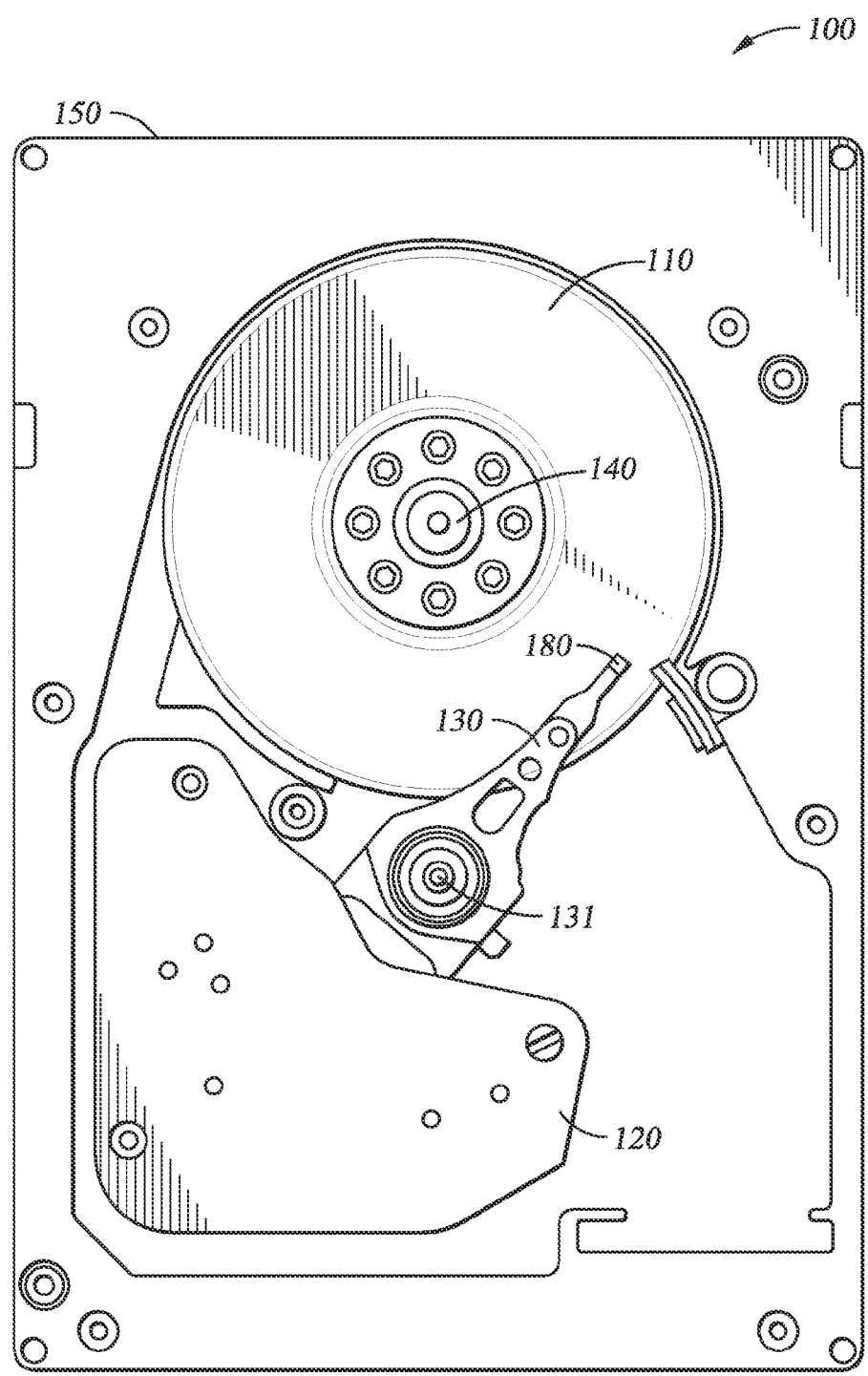
FIG. 1 illustrates an exemplary magnetic disk drive, according to an embodiment of the invention.

FIG. 1 illustrates a top view of an exemplary HDD 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
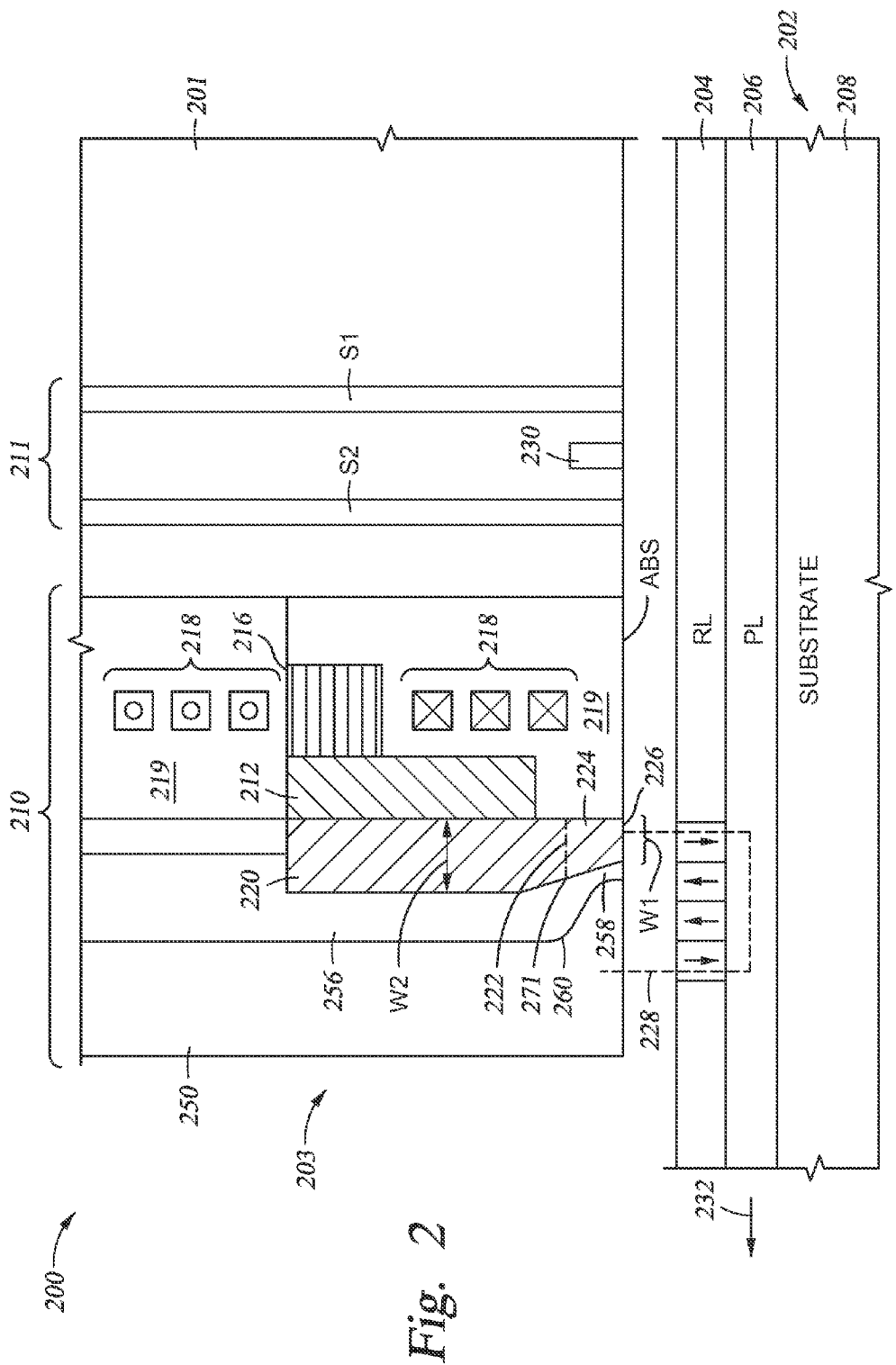
FIG. 2 is a side view of a read/write head and magnetic disk of the disk drive of FIG. 1, according to one embodiment of the invention.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that its ABS is facing the magnetic disk 202. In FIG. 2, the disk 202 moves past the write head 210 in the direction indicated by the arrow 232, so the portion of slider 201 that supports the read/write head 200 is often called the slider "trailing" end 203.

In some embodiments, the magnetic read head 211 is a MR read head that includes an MR sensing element 230 located between MR shields S1 and S2. In other embodiments, the magnetic read head 211 is a MTJ read head that includes a MTJ sensing device 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR (or MTJ) sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2 further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

Figure 3A:
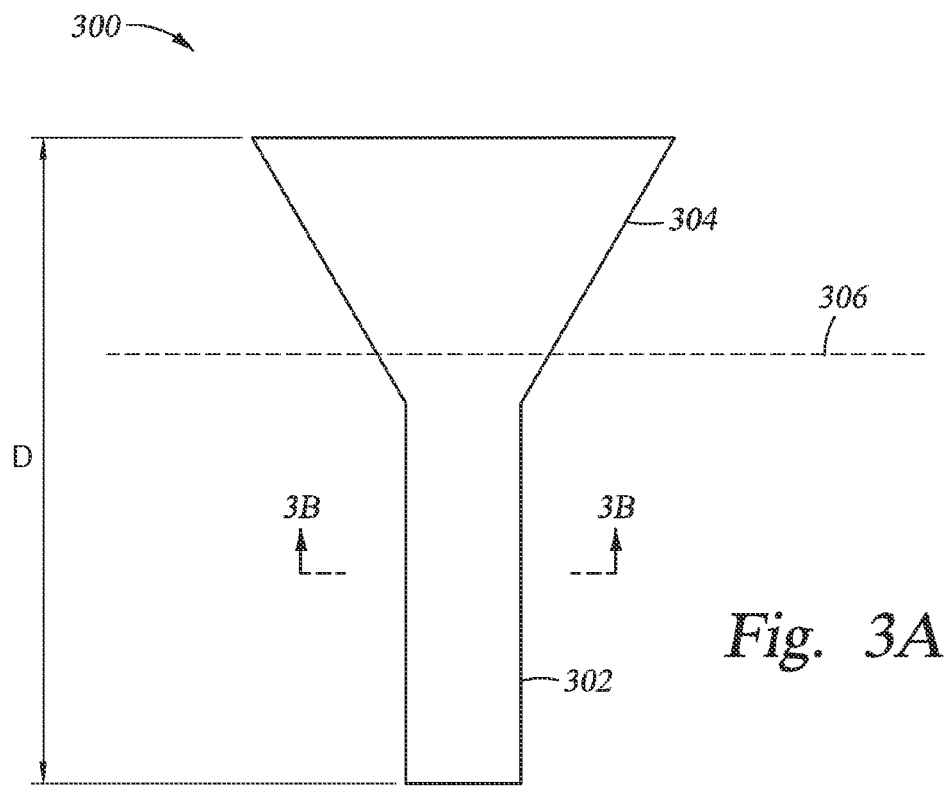
FIG. 3A is a top view of a write pole prior to being cut to define an ABS according to one embodiment of the invention.
Figure 3B:
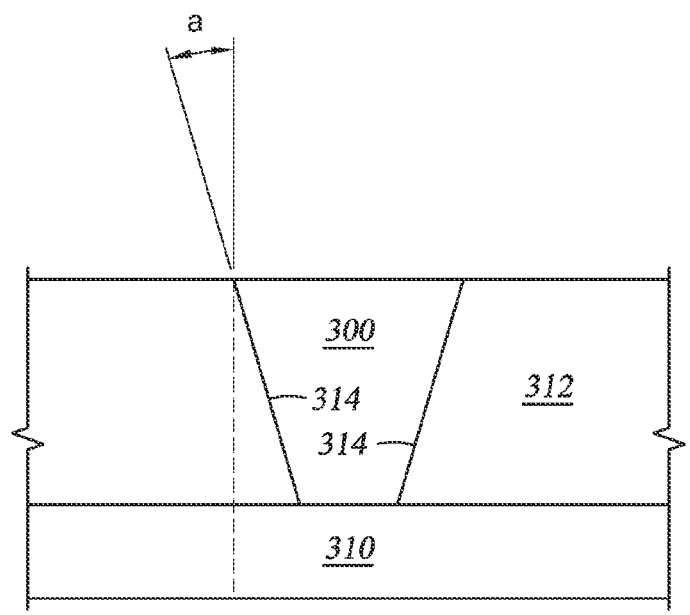
FIG. 3B is a schematic cross-sectional view of the write pole of FIG. 3A according to one embodiment of the invention.

FIG. 3A illustrates a top view of a write pole 300 prior to being cut to define the ABS. The write pole 300 has a straight region 302 and a wider flared region 304, and the ABS may be anywhere along the straight region 302 or the flared region 304. In one embodiment, the ABS is defined at line 306 by cutting the write pole at line 306. FIG. 3B illustrates a schematic cross-sectional view of the write pole 300 at cross section 3B shown in FIG. 3A. The write pole is deposited over a substrate 310 and in a trench formed in a fill layer 312. The substrate 310 may include one or more components of the magnetic recording head such as, for example, the read head, one or more magnetic coils, and the like, formed therein. The fill layer 312 is deposited over the substrate 310 and may be a non-magnetic material such as silicon nitride, alumina, or the like. As shown in FIG. 3B, the trench has side walls 314 that are tapered inwardly, and the side walls have a bevel angle "a" with respect to vertical. When the trench is formed with more than one masks and one reactive ion etching (RIE) process, the bevel angle "a" varies along the length "D" of the write pole 300, as shown in FIG. 3A. The method described herein utilizes a single mask and multiple RIE processes to form a trench having consistent bevel angle along the length "D". In addition, the side walls of the trench are substantially straight at any point along the length "D".

Figure 4A:
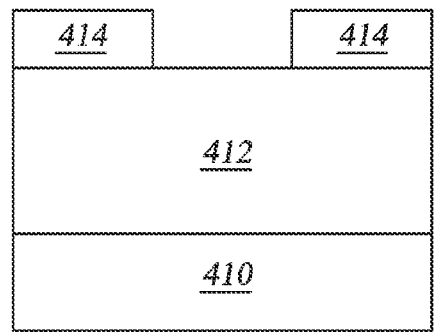
FIGS. 4A-4D illustrate a process for forming a trench according to one embodiment of the invention.

FIGS. 4A-4D illustrate a process of forming a trench 426 according to one embodiment of the invention. As shown in FIG. 4A, a fill layer 412 is formed over a substrate 410. The substrate 410 may correspond to the substrate 310 illustrated in FIG. 3B. The substrate 410 may also include a stop layer (not shown) as the topmost layer. The fill layer 412 may correspond to the fill layer 312 illustrated in FIG. 3B. A etch mask layer 414 is deposited over the fill layer 412 and is patterned so the shape of the etch mask layer 414 is transferred to the fill layer 412. The etch mask layer 414 may be a metal mask made with a material such as chromium (Cr), nickel chromium (NiCr), nickel iron (NiFe), or any other suitable metal. The etch mask layer 414 may be patterned using any suitable patterning methods, such as using a photoresist.

Figure 4B:
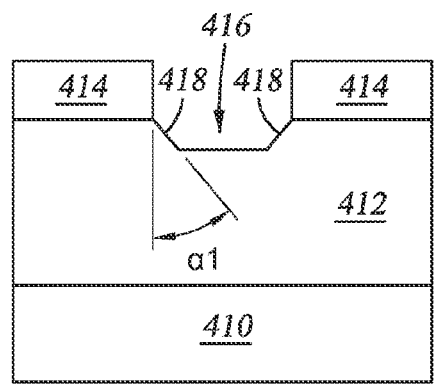

Next, a first RIE process is performed in a process chamber, such as a plasma etch chamber. The first RIE process may be performed using chlorine/fluorine based chemistry to remove a portion of the fill layer 412 not covered by the etch mask layer 414 and to form a trench 416 having tapered side walls 418. The trench 416 has a bevel angle "a1" as shown in FIG. 4B. The bevel angle "a1" may be between about 5 degrees and about 30 degrees with respect to vertical. During the first RIE process, a gas mixture may be introduced into the process chamber. The gas mixture may include a chlorine containing gas and a nitrogen containing gas, such as boron trichloride ($BCl_3$) and nitrogen ($N_2$). Alternatively, the gas mixture may include a chlorine containing gas and a fluorine containing gas such as $BCl_3$ and tetrafluoromethane ($CF_4$). The flow rate of the chlorine containing gas may be between about 50 standard cubic centimeters per minute (sccm) and about 90 sccm. In one embodiment, $BCl_3$ having a flow rate of about 60 sccm and $CF_4$ having a flow rate of about 10 sccm are introduced into the process chamber for the RIE process. The ratio of the flow rates of $BCl_3$ to $CF_4$ is about 6. The first RIE process may have a source power between about 1200 W and about 1800 W. A bias is applied to the substrate and the bias power is between about 10 W and about 300 W. The process temperature is between about 35 degrees Celsius and about 55 degrees Celsius.

Figure 4C:
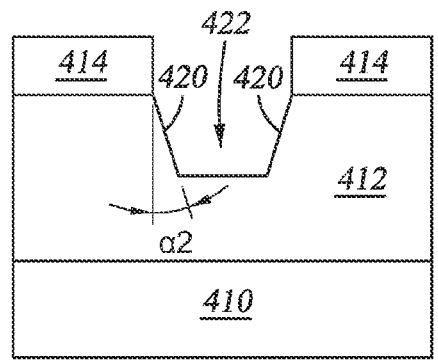

Next, a second RIE process is performed to remove a portion of the fill layer 412 to form a trench 422, as shown in FIG. 4C. As a result, the trench 422 having tapered side walls 420 is deeper and has a smaller bevel angle "a2" than the bevel angle "a1" of the trench 416. The bevel angle "a2" may be between about 4 degrees and about 29 degrees with respect to vertical. The process conditions of the second RIE process may be the same as the first RIE process, except that the ratio of the flow rates of $BCl_3/N_2$ or chlorine/fluorine containing gases is about 5% less than the ratio of the flow rates of the gases in the first RIE process. Thus, in the embodiment where $BCl_3$ and $CF_4$ are utilized, the ratio of the flow rates of $BCl_3$ to $CF_4$ is about 5.7 for the second RIE process. Alternatively, the second RIE processes may have different process conditions, in addition to the different gas flow rates, from the first RIE process, and the trench 422 is formed as a result.

Figure 4D:
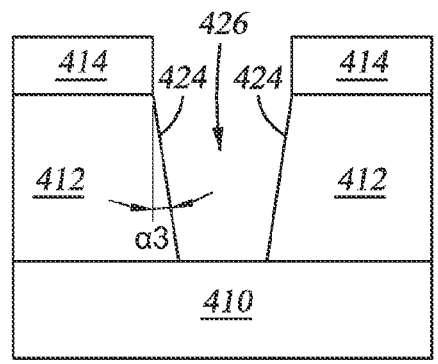

In some embodiments, after two RIE processes, a trench having substantially straight side walls and a bevel angle that is consistent along the length "D" of the write pole may be formed. In other embodiments, a third RIE process may be performed to form such a trench. As shown in FIG. 4D, a trench 426 is formed as a portion of the fill layer 412 from the trench 422 is removed by the third RIE process. The trench 426 has taped side walls 424 that are substantially straight and a bevel angle "a3" that is smaller than both the bevel angles "a1" and "a2". Again, the process conditions of the third RIE process may be the same as the second RIE process, except that the ratio of the flow rates of $BCl_3/N_2$ or chlorine/fluorine containing gases is about 5% less than the ratio of the flow rates of the gases in the second RIE process. Alternatively, the third RIE process may have different process conditions from the first or second RIE process, and the trench 426 is formed as a result.

Additional RIE processes may be performed to form the trench having tapered and substantially straight side walls and a bevel angle that is consistent along the length "D" of the write pole. The trench as described above may be formed by two or more RIE processes. After such a trench is formed, a magnetic material may be deposited within the trench to form the write pole. The magnetic material may be any suitable material for the write pole, such as CoNiFe. Alternatively, an insulating layer may be conformally deposited into the trench and the magnetic material is deposited on the insulating layer. The write pole may be planarized by chemical mechanical polish. The etch mask layer 414 may then be removed by any suitable removal method such as ion milling.

Figure 5:
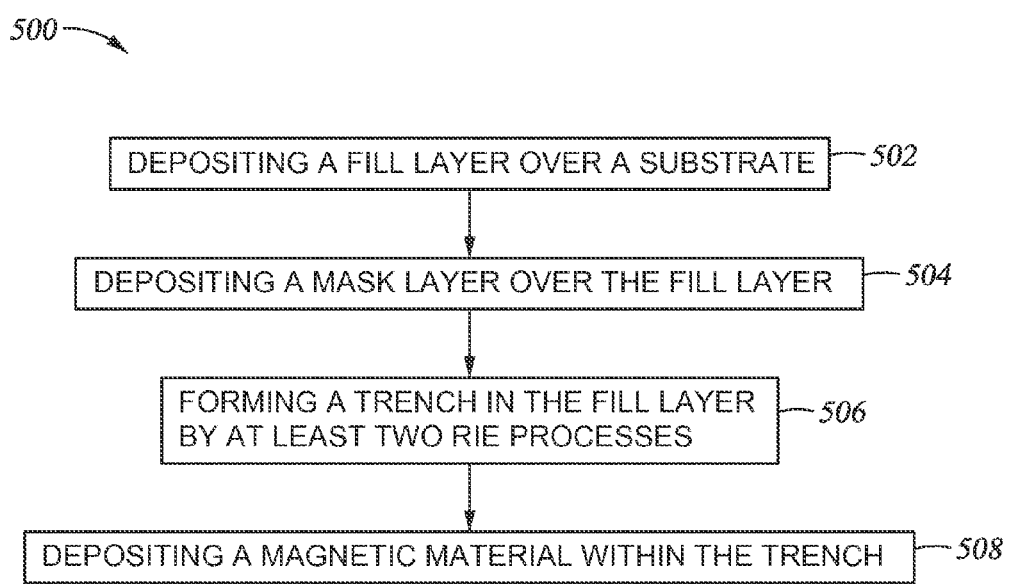
FIG. 5 is a flow diagram of a method for forming a magnetic head according to one embodiment of the invention.

FIG. 5 is a flow diagram of a method 500 for forming a magnetic head according to one embodiment of the invention. The method 500 starts at process 502 by depositing a fill layer over a substrate. The substrate may include one or more components of the magnetic recording head such as, for example, the read head, one or more magnetic coils, and the like, formed therein. The substrate may also include a stop layer as the topmost layer. The fill layer may be a non-magnetic material such as silicon nitride, alumina, or the like.

At process 504, an etch mask layer is deposited over the fill layer. The etch mask layer may be a metal mask made with a material such as Cr, NiCr, NiFe, or any other suitable metal. The etch mask layer may be patterned using any suitable patterning method, such as using a photoresist. Next, at process 506, a trench having substantially straight side walls and consistent bevel angle along the length of a write pole is formed in the fill layer by at least two RIE processes. The first RIE process may include flowing a chlorine containing gas and a fluorine containing gas into a process chamber. The chlorine containing gas may have a flow rate between about 50 sccm and about 90 sccm. As a result of the first RIE process, a trench having tapered side walls is formed in the fill layer. The trench has a bevel angle between about 5 degrees and about 30 degrees with respect to vertical.

A second RIE process may be performed following the first RIE process to form a trench having substantially straight side walls and consistent bevel angle along the length "D" of the write pole. The trench may have a bevel angle between about 4 degrees and about 29 degrees, and the bevel angle is less than the bevel angle of the trench formed by the first RIE process. Additional RIE processes may be performed to form a trench having substantially straight side walls and consistent bevel angle along the length "D" of the write pole. Each of these RIE processes may have the same process conditions as the previous RIE process, except the ratio of the flow rates of $BCl_3/N_2$ or chlorine/fluorine containing gases may be about 5% less than the ratio of the flow rates of the gases in the previous RIE process. The bevel angle formed by each RIE process is less than the bevel angle formed by the previous RIE process.

At process 508, a magnetic material is deposited within the trench to form a write pole. The magnetic material may be any material suitable for the write pole, such as CoNiFe. Alternatively, an insulating layer may be conformally deposited into the trench and the magnetic material is deposited on the insulating layer.

In summary, a method for forming a trench having substantially straight side walls and a consistent bevel angle along the length of the write pole is disclosed. The method utilizes a single mask layer and multiple RIE processes to form such trench. With consistent bevel angle along the length of the write pole, the bevel angle at the ABS is also consistent regardless of the position where the write pole is cut to define the ABS.

While the foregoing is directed to embodiments of the present invention, other and further embodiments of the invention may be devised without departing from the basic scope thereof, and the scope thereof is determined by the claims that follow.

What is claimed is:

1. A method for forming a magnetic head for perpendicular magnetic recording, comprising:
   depositing a fill layer over a substrate;
   depositing a mask layer over the fill layer;
   removing a portion of the mask layer to expose a first portion of the fill layer;
   removing the first portion of the fill layer by a first reactive ion etching process to form a first trench having a first bevel angle, wherein the first bevel angle is between about 5 degrees and about 30 degrees;
   removing a second portion of the fill layer from the first trench by a second ion etching process to enlarge the first trench to form a second trench and change the first bevel angle to a second bevel angle, wherein the second bevel angle is smaller than the first bevel angle;
   removing a third portion of the fill layer from the second trench by a third reactive ion etching process to enlarge the second trench to form a third trench and change the second bevel angle to a third bevel angle; and
   depositing a magnetic material within the third trench, wherein the third trench has substantially straight side walls.

2. The method of claim 1, wherein the mask layer comprises Cr, NiCr, or NiFe.

3. The method of claim 1, wherein the first reactive ion etching process comprises flowing a chlorine containing gas and a fluorine containing gas into a process chamber.

4. The method of claim 3, wherein the chlorine containing gas comprises $Cl_2$ or $BCl_3$, and the fluorine containing gas comprises $CF_4$.

5. The method of claim 3, wherein the chlorine containing gas has a flow rate between about 50 sccm and about 90 sccm.

6. The method of claim 1, wherein the second bevel angle is between about 4 degrees and about 29 degrees.

7. The method of claim 1, wherein the third bevel angle is smaller than the second bevel angle.

8. A method for forming a magnetic head for perpendicular magnetic recording, comprising:
   depositing a fill layer over a substrate;
   depositing a mask layer over the fill layer;
   removing a portion of the mask layer to expose a first portion of the fill layer;
   etching the first portion of the fill layer with a first plasma containing chlorine and fluorine to form a first trench having a first bevel angle, wherein the first bevel angle is between about 5 degrees and about 30 degrees;
   etching the fill layer inside the first trench with a second plasma containing chlorine and fluorine to enlarge the first trench to form a second trench and change the first bevel angle to a second bevel angle, wherein the second bevel angle is smaller than the first bevel angle;

etching the fill layer inside the second trench with a third plasma to enlarge the second trench to form a third trench and change the second bevel angle to a third bevel angle; and depositing a magnetic material within the third trench, wherein the third trench has substantially straight side walls.

9. The method of claim 8, wherein the etching the first portion of the fill layer comprises flowing a chlorine containing gas and a fluorine containing gas into a process chamber.

10. The method of claim 9, wherein the chlorine containing gas comprises $Cl_2$ or $BCl_3$ and has a flow rate between about 50 sccm and about 90 sccm, and the fluorine containing gas comprises $CF_4$.

11. The method of claim 8, wherein the second bevel angle is between about 4 degrees and about 29 degrees.

12. The method of claim 8, wherein the third bevel angle is smaller than the second bevel angle.

* * * * *